United States Patent [19]

Goldman

[11] Patent Number: 4,667,999

[45] Date of Patent: May 26, 1987

[54] PINCH-FRAME FOR HOLDING FROZEN FOOD PACKETS

[76] Inventor: Ronald J. Goldman, 1947 Albion, Chicago, Ill. 60626

[21] Appl. No.: 798,850

[22] Filed: Nov. 18, 1985

[51] Int. Cl.⁴ ............................................. A67J 45/07
[52] U.S. Cl. ................................................. 294/31.1
[58] Field of Search ................... 294/31.1, 99.2, 16, 294/1.1, 33, 27.5, 26.5, 148, 164, 167, 169; 229/52 A, 52 AW, 52 AM; 220/94 A

[56] References Cited

U.S. PATENT DOCUMENTS 2,114,080  4/1938  LeBaron ............................ 294/31.1
3,059,809  10/1962  Thompson ......................... 294/31.1

Primary Examiner—James B. Marbert

Attorney, Agent, or Firm—Jack L. Uretsky

[57] ABSTRACT

In a device for holding a rectangular package of frozen foods, a pinch-frame constructed from a pair of Y-shaped members, each member having tow integrally formed arms, the upper arm of the Y-shaped meeting in a right angle. Integrally formed handles extend outwardly from the exterior of each respective right-angled vertex, in approximately the plane of the two arms, to provide the tail of the Y-shaped of each member, Each of the extended arms of each member is flat on one side of the Y-shape thereby defining two contact pads that are held in contact by connection. The handles of each member is stepped outwardly to form fulcrum means that when the handles are squeezed together open the contact faces.

11 Claims, 4 Drawing Figures

U.S. Patent    May 26, 1987    4,667,999
FIG. 1
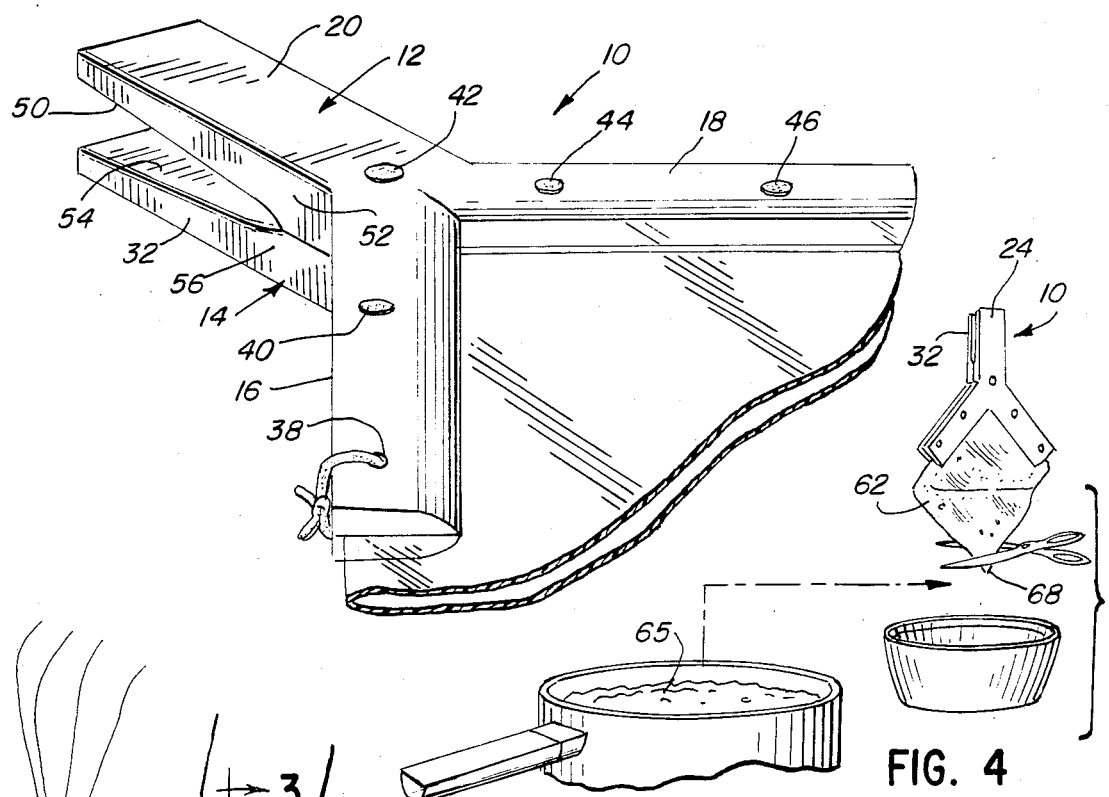
FIG. 4
FIG. 2
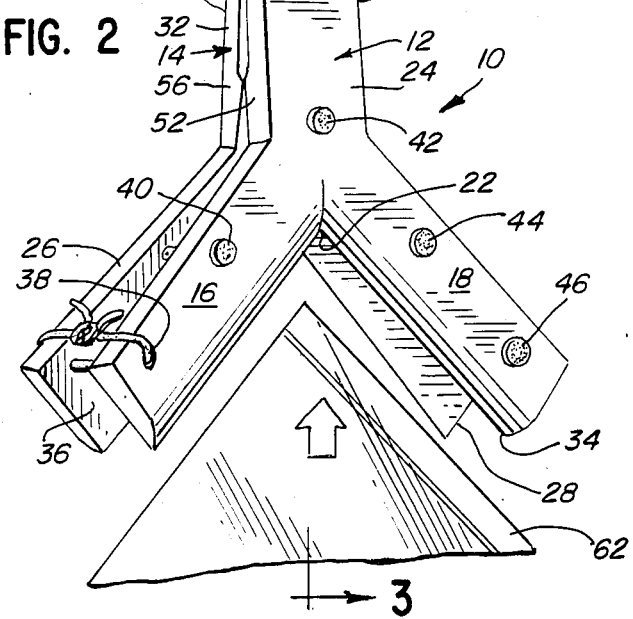
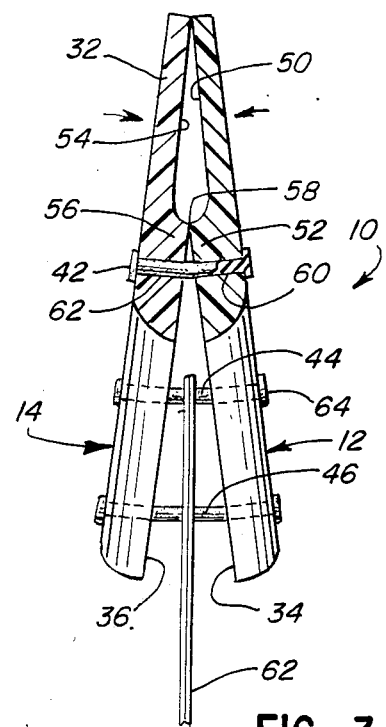
FIG. 3

PINCH-FRAME FOR HOLDING FROZEN FOOD PACKETS

This invention relates generally to kitchen utensils. More particularly, this invention relates to utensils for holding frozen food packages and immersing such packages in hot water.

BACKGROUND OF THE INVENTION

Frozen food is often packaged in rectangular plastic packages that are suitable for freezer storage and cooking. Cooking frequently requires that the plastic package be immersed in boiling water until the food and package is hot. The package, after heating, is removed from the water and cut open to dispense the food contents of the package onto a plate.

Frozen food packages are awkward to handle during and after cooking because a utensil may be needed to remove the packages from the boiling water and, once removed, the packages are too hot to handle comfortably with bare hands. It would, therefore, be desirable to have a tool that is specifically adapted to the handling of such packages.

Scales, J. K. in U.S. Pat. No. 3,819,089 has proposed constructing food storage packages that have attached hangers. The hangers are constructed with extended arms that fit over the sides of a cooking pot. When the hanger arms are in place on the pot the attached package is suspended within the pot immersed in hot water. The hangar is intended to facilitate removal of the heated package and handling of the heated package after removal.

Much of the frozen food that is presently being marketed, however, is not sold in packages with attached hangers, nor are the packages adapted for use with such hanger.

What is needed is a utensil that is specifically adapted for grasping and handling of presently marketed frozen food packages during and after cooking.

SUMMARY OF THE INVENTION

One embodiment exemplifying principles of the present invention may comprise a pinch-frame for holding a rectangular package of frozen food. The pinch=frame is constructed from a pair of Y-shaped members, each member having two integrally formed arms, the upper arms of the Y-shape meeting in a right angle. Integrally formed handles extend outwardly from the exterior of each respective right-angled vertex, in approximately the plane of the two arms, to provide the tail of the Y-shape of each member.

Each of the extended arms of each member is flat on one side of the Y-shape. A flat contact face is thereby defined for each member. The two contact faces thus formed are held in contact with each other by connectors that elastically compress the contact faces against each other.

The handle of each member is stepped outwardly away from the respective flat contact face of the member. The handles are accordingly opposed to each other and spaced away from each other when the contact faces are fully in contact. As a result, when the handles are squeezed together, a small area of each contact face, in the neighborhood of the right-angled vertex, provides a neighborhood of continuing contact that acts as a fulcrum. A squeezing force applied to the handles to bring the handles closer to each other accordingly causes the contact faces to rotate outwardly from the fulcrum to separate the faces and provide an opening angle between the faces for insertion of a frozen food package.

The Y-shaped members are fashioned from an insulating material such as wood or a suitable plastic.

After the frozen food package is inserted into the angle between the contact faces, the squeezing force on the handles is relaxed. The compressive force of the connectors then forces the contact faces together again, thereby causing the contact faces to pinch the frozen food package between them. The compressive force that pinches the package is sufficient to hold the package securely against the force of gravity. The frozen food package will typically be arranged to have a corner and adjacent edges caught within the respective right angled vertex and extended arms of the pinch-frame so that the pinch-frame 'frames' a corner and two sides of the package.

The frozen food package held by the pinch=frame is then immersed in a pot of boiling water for cooking, the handles of the pinch-frame projecting out of the water for convenient grasping. The handles remain cool to the touch because of the insulating material used in the pinch-frame construction. The cool projecting handles thereby enable easy removal of the package from the boiling water once the contents are cooked. The package of cooked food may then be held over a dinner plate suspended from the pinch-frame. Cutting of a lower corner, for example with scissors, permits the food to fall onto the plate for serving.

A feature of the present invention is the provision of a utensil that is adapted to hold a package of frozen food for immersion and removal from a pot of boiling water.

An advantage of the present invention is the provision of a utensil that is adapted to the shape of a frozen food package to enable convenient handling of the package in a heated environment without direct manual contact with the package.

Other features, objects and advantages of the present invention will be apparent from the following detailed description of a preferred embodiment, presented in conjunction with the following drawings.

BRIEF DESCRIPTION OF THE DRAWINGS

FIG. 1 is an oblique frontal perspective view of a pinch-frame, constructed in accordance with principles of the present invention, holding a corner of a frozen food package.

FIG. 2 is an oblique upper perspective view of the pinch-frame of FIG. 1 illustrating the insertion of the corner of the frozen food package shown in FIG. 1.

FIG. 3 is a cross-sectional side view of the pinch-frame of FIGS. 1 and 2, showing the section 3—3 of FIG. 2.

FIG. 4 illustrates the use of the pinch-frame of FIGS. 1—3 for removal of a frozen food package from boiling water into a position for deposit of the contents into a bowl.

DETAILED DESCRIPTION OF A PREFERRED EMBODIMENT

A pinch-frame 10, as illustrated in FIG. 1, exemplifies an embodiment of the present invention. The pinch-frame may comprise a pair of opposed members 12 and 14, constructed of an insulating material such as wood or plastic. The member 12 is constructed to provide a generally Y-shaped, integrally connected structure, including a pair of arms 16, 18 joined to form an interior right angle 22, and a handle 24. The handle 24 projects outwardly away from the external vertex of the angle 22 to provide the tail of the Y. The member 14 is similarly constructed with arms 26, 28, interior angle 30 and handle 32, as is seen in FIG. 2.

The members 12, 14 are shaped and sized to fit against each other to provide a single Y-shaped structure 10, as illustrated in the FIGS. The pairs of arms 16, 18 and 26, 28 are respectively provided with flat contact faces 34 and 36 which are forced into tight contact by elastic connectors 38, 40, 42, 44, 46.

An interior face 50 of the handle 24, on the contact side of the Y-shape, is stepped away from the vertex portion 52 of contact face 34. An interior face 54 of the handle is 32 is similarly stepped away from the vertex portion 56 of contact face 36. The handles are accordingly spaced away from each other to provide for levering action about a fulcrum line 58, defined on the opposed touching, contact faces 34, 36, near the vertex of the right angle of the Y-shape, illustrated in FIG. 3, to rotate contact faces 34, 36 outwardly away from each other by compression of the handles toward each other.

The elastic connectors 38, 40, 42, 46 may comprise rubber or synthetic rubber strips or tubes or other elastic material. In one embodiment the bodies 12 and 14 are pierced with a plurality of through bores at the positions of the connectors 38, 40, 44, 46 through the respective opposed arms 16, 26 and 18, 28, as shown in the FIGS. Another through bore 60, 62 at the position of the connector 42 pierces the bodies 12, 14, just above the fulcrum line 58, as illustrated in cross-section in FIG. 3. ('Above' in the present context, refers to the direction away from the tail of the Y-shape). The rubber tubes in the illustrated example are of the type used as tourniquets in the practice of medicine. The tubes 38, 40, 42, 44, 46 are passed through the bores such as the bores 60, 62. The ends of the tubes may then be tied off in order to prevent the ends of the tube from slipping through the bore.

Alternatively, the ends of each tube may be tied together on the outer edge of the respective pairs of arms 16, 26 and 18, 28 as is illustrated for the tube passing through the bore 38.

Alternatively, the tubes may terminate at each end with widened portions, such as the widened portion 64 illustrated in the FIG. 3. The widened portion 64 may either be integrally fashioned with the tube 42 and forced through the respective bores or molded on, or otherwise secured to the ends of the tubes, once the tubes are threaded through the respective bores.

The tubes are secured, either by tying or as otherwise described, so as to force the respective opposed contact faces 34, 36 into tight contact.

An exemplary use of the described embodiment is illustrated in FIG. 3, which shows the pinch-frame 10 in position to pinch and hold a corner of a frozen food package 62. Pinching of the package is accomplished by manually squeezing together the handles 24, 32. The squeezing causes outward rotation of the contact faces 34, 36 about the fulcrum line 58, thereby separating the contact faces and permitting insertion of the corner of the frozen food package 62 between the faces, as illustrated in FIG. 3. Release of the handles 24, 32 then permits the contact faces 34, 36 to rotate toward each other and firmly pinch the sides of the package between the faces, as illustrated in FIG. 4.

The arms of the pinch-frame 10, firmly clamped upon the frozen food package 62, are inserted into boiling water 65, illustrated in FIG. 4, to heat the contents of the package. When the food is ready the package and pinch-frame are readily removed from the boiling water by means of the handles 24, 32, which remain cool to the touch because of the insulated construction of the pinch-frame. The package, after removal may be suspended over a bowl 66, as exemplified in FIG. 4, so that the contents of the package falls into a lower corner 68.

The lower corner of the package may then be opened, as by cutting with scissors, to permit the contents to be deposited in the bowl.

It will of course be understood that modification of the present invention in its various aspects will be apparent to those skilled in the art, some being apparent only after study and some being a matter of routine design. Further, the use of the particular structure and structural shapes described herein are not necessary features of the present invention. For example, the structural feature of the embodiment having straight arms joined at a right angle is not a necessary feature of the present invention. Some frozen food packages may be held more conveniently by a structure with curved arms, or arms joined at an angle different from 90°. Also, the use of rubber tubing to hold the contact faces together is not a necessary feature of the present invention. Other embodiments falling within the scope of the invention may use metal springs, such as are commonly used with clothespins. It should be noted, however, that principles of the invention may also be embodied in a structure suitable for use with food packages heated in microwave ovens. Such structures should avoid the use of metal, and be constructed of glass or suitable plastics that do not become hot when irradiated by microwaves. Accordingly, the scope of the invention should not be limited by the particular embodiments and specific constructions described herein, but should be defined only by the appended claims and equivalents thereof.

What is claimed is:

1. A pinch-frame for holding a rectangular package of frozen food or the like in a heated enviroment comprising;
    a pair of approximately right-angled members, each member having a planar contact face, said contact faces being mutually opposed;
    tension means engaging said right-angled members, said tension means providing a pinching force urging said opposed contact faces into tight contact;
    said right-angled members and said contact face having extensions, and said extensions being indented to provide lever means for manually overcoming said pinching force to selectively seperate said contact faces to permit insertion of the edges of the rectangular packet.

2. A pinch-frame as in claim 1 wherein said lever means and said right-angled members include insulating means to permit bare-handed immersion and retraction of said members respectively into and from boiling water.

3. A pinch-frame as in claim 1 wherein said right-angled members and said extension means are arranged in a Y-shaped structure, said extensions comprising the tail of the "Y" and said right-angled members comprising the upper arms of said "Y".

4. A pinch-frame as in claim 3 wherein said extensions comprises a pair of elongated handles, each said elongated handle being integral with and extending away from the external vertex of a respective one of said right-angled members.

5. A pinch-frame as in claim 4 wherein said elongated handles are opposingly spaced away from each other, and said contact faces are in contact in the neighborhood of the contact face vertices, said neighborhood of contact providing a fulcrum for rotating said contact faces away from each other about said fulcrum by manually squeezing said elongated handles, one toward the other.

6. A pinch-frame as in claim 1 wherein said extensions are insulated to provide a relatively cool surface for bare-handed grasping when said pinch-frame is immersed in boiling water.

7. A pinch-frame as in claim 1 for use in microwave heating of frozen food packages, constructed of material that does not become hot when irradiated by microwaves.

8. A pinch-frame for holding packages of frozen food and the like comprising:
arm members adopted to the shape of a frozen food package, said arm members being shaped and arranged for pinching and holding rigid an extended length of the periphery of a frozen food package;
tension spring means engaging said arm members for providing a pinching force to said arm members, said pinching force effectuating said pinching; and
handle means operatively associated with said tension spring means to release and apply said pinching force in order to effect and to release said pinching.

9. A pinch-frame as in claim 1 wherein said tension means comprisess elastic connectors.

10. A pinch-frame as in claim 9 wherein said elastic connectors extend through bores pierced in said-right angled members.

11. A pinch frame as in claim 9 wherein said elastic connectors are fashioned of non-metallic material for use in a microwave oven.

* * * * *